(12) United States Patent
Newton

(10) Patent No.: X6527
(45) Date of Patent: Apr. 29, 1831

(54) SAW, GUMMING THE TEETH OF SAW MILL AND CROSSCUT

(76) Inventor: Phineas Newton

Phinehas Newton

Letters Patent

The Schedule referred to in these Letters Patent and making part of the same containing a description in the words of the said Phinehas Newton himself of his improvement in the machine for gumming Mill and cross cut Saws A Machine for gumming Mill and cross cut Saws
A Block of wood one foot eight inches in length. ten inches in width six inches in thickness or iron sufficient in strength for the support of the machine. through this block is fastened two eyes for the support of the lever by screws or keys at the bottom these eyes may be cast or wrought iron. these said eyes from two to three inches below or from the fulcrum hole for the lever is projected out in front sufficient for a rest for the face. this fulcrum is an inch or less bolt passing through the eyes and through the end of the lever which end is half round in front of these eyes or on the side where the rests are is fastened a face with screw bolts or wedges with a perforation in the form of a chip to be extracted from the saw plate to constitute a tooth opposite this face is fastened a bar of iron so faced at the one end so as to enter the perforation in the face and passing between the eyes and fastened at the other end so as to form a hinge. the end of this bar or driver when it enters the face it is made slanting or twisting so as to operate like the shears nearly from the point to the roots of the teeth under this bar or driver is made a spring for the purpose of raising the bar or driver to receive the saw plate. N B. this block and driver and face lies horizontal and eyes stand perpendicular & lever nearly so. when the machine receives the saw plate for the purpose of cutting out the chip to constitute a tooth. April 4th 1831

Witnesses
Horace Newton
Jabez P Rogers (378 words)

Phinehas Newton

[illegible]